United States Patent
Aronson

(10) Patent No.: US 7,325,982 B2
(45) Date of Patent: Feb. 5, 2008

(54) RECEIVER OPTICAL SUBASSEMBLY WITH OPTICAL LIMITING ELEMENT

(75) Inventor: Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 47 days.

(21) Appl. No.: 11/070,872

(22) Filed: Mar. 2, 2005

(65) Prior Publication Data

US 2005/0196110 A1    Sep. 8, 2005

Related U.S. Application Data

(60) Provisional application No. 60/549,627, filed on Mar. 3, 2004.

(51) Int. Cl.
*G02B 6/36* (2006.01)
(52) U.S. Cl. .......................................... 385/92; 385/89
(58) Field of Classification Search ..................... None
See application file for complete search history.

(56) References Cited

U.S. PATENT DOCUMENTS

| | | | |
|---|---|---|---|
| H491 H * | 7/1988 | Pitruzzello et al. ......... | 385/140 |
| 5,741,442 A | 4/1998 | McBranch et al. | |
| 6,061,493 A * | 5/2000 | Gilliland et al. ............ | 385/140 |
| 6,757,308 B1 | 6/2004 | Eldring et al. | |
| 6,888,169 B2 | 5/2005 | Malone et al. | |
| 2001/0030789 A1 | 10/2001 | Jiang et al. | |
| 2002/0076148 A1 | 6/2002 | DeRosa et al. | |
| 2003/0085054 A1 | 5/2003 | Ames et al. | |
| 2003/0156607 A1 | 8/2003 | Lipson et al. | |
| 2003/0236019 A1 | 12/2003 | Hanley et al. | |
| 2004/0101258 A1 | 5/2004 | Aronson et al. | |
| 2004/0247242 A1 | 12/2004 | Blasingame et al. | |
| 2005/0013547 A1 | 1/2005 | Rossi et al. | |

FOREIGN PATENT DOCUMENTS

JP    59060414 A    *    4/1984

OTHER PUBLICATIONS

"Optical Power Limiter Series 86580", Kilolambda product datasheet, 2003. http://www.kilolambda.com/docs/LIMITER_Preliminary_Brochure_V5.pdf.
IEC 60825-2 "Safety of laser products—Part 2: Safety of optical fibre communication systems (OFCS)." Edition 3.0, Jun. 28, 2004.

* cited by examiner

*Primary Examiner*—Sung Pak
(74) *Attorney, Agent, or Firm*—Workman Nydegger

(57) ABSTRACT

This disclosure concerns the use of optical limiting materials in devices such as optical transceivers. In one example, a receiver optical subassembly includes a detector element positioned to receive incoming optical signals from an optical fiber. An optical limiting element is positioned between the optical fiber and the detector element so that a received optical signal having a power level exceeding a predetermined limit is attenuated to a predetermined extent prior to being received at the detector element.

33 Claims, 5 Drawing Sheets

RECEIVER OPTICAL SUBASSEMBLY WITH OPTICAL LIMITING ELEMENT

CROSS REFERENCE TO RELATED APPLICATIONS

This application claims priority to U.S. Provisional Patent Application No. 60/549,627 filed Mar. 3, 2004 and entitled "Receiver Optical Sub-Assembly Incorporating Optical Limiting Materials," which is incorporated herein in its entirety by this reference.

BACKGROUND OF THE INVENTION

1. The Field of the Invention

The present invention relates generally to the field of fiber optic transceivers. More particularly, embodiments of the present invention relate to methods and devices for attenuating optical signals in a receiver optical subassembly.

2. Related Technology

Fiber optic transceivers are used in a variety of fiber optic applications to convert electrical signals to optical signals and optical signals to electrical signals. One component of a fiber optic transceiver, a transmitter optical subassembly (TOSA), receives an electrical signal, converts the electrical signal to an optical signal, and transmits the optical signal. A second component of a fiber optic transceiver, a receiver optical subassembly (ROSA), receives optical signals and then converts the optical signals to electrical signals.

Detector elements located within ROSAs detect the optical signal that has been received into the ROSA. The detector elements located within ROSAs have limits on the maximum optical power the detector elements can usefully employ. One limit is known as the optical overload limit, or level, and refers to the maximum power of an optical signal that can be successfully processed by a ROSA without the occurrence of bit errors or other degradations beyond the specifications of the ROSA. When the optical overload level is exceeded, the ROSA will cease functioning properly. However, the ROSA will once again function properly when the power level of the optical signal falls back below the overload limit. A second limit, known as the optical damage threshold, refers to a limit on the power of an optical signal which a ROSA is able to withstand. If the power of an optical signal received by the ROSA rises above the optical damage threshold, the ROSA will be permanently damaged.

The optical overload limit and the optical damage threshold are parameters of detectors which may be employed in a ROSA. For example, Avalanche Photodiode Detectors (APDs) are used in ROSAs, particularly in systems where optical amplification is present. APDs use internal gain mechanisms to achieve greater sensitivity than the more common PIN detectors, but tend to do so at the expense of having lower optical overload and damage limits. Networks that employ optically amplified signals are particularly susceptible to damage since the output of optical amplifiers can be as much as 10 to 100 times larger than the overload and damage thresholds of the detectors. In normal configurations, these networks are designed never to expose the detectors to these high power levels. However, it is not uncommon for operator error to result in high powered signals being connected directly to receiver optical inputs, which usually results in destruction of the detector and requires replacement of the entire ROSA.

A common damage mechanism for many detector elements is thermal in nature. Thus, in order to protect a detector from destruction due to high temperatures resulting from excess optical power, it is desirable to limit the time a powerful optical signal is striking the detector to a time significantly shorter than the time necessary to raise the temperature of optical elements beyond a critical point. For the levels of power typically involved (6-20 dBm or 4-100 mW), this time scale is in the range of microseconds ($10^{-6}$-$10^{-3}$ seconds).

One technique employed for protecting detector elements from the damaging thermal effect of powerful optical signals relates to controlling the photocurrent through the detector element. Resistors or other current limiting circuits are connected to the detector element to limit the current through the detector element. While such circuitry systems may help to limit one form of detector element destruction due to current heating effects, such systems cannot prevent the direct destruction of the detector element from more powerful optical signals.

SUMMARY OF AN EXEMPLARY EMBODIMENT OF THE INVENTION

Problems in the art relating to control of the power of optical signals in ROSAs are overcome by embodiments of the present invention which incorporate optical limiting materials, embodied as optical limiting elements, into the design of a ROSA to control the power of optical signals received at the detector element. In one exemplary embodiment, a ROSA includes a detector element, optical limiting element, and a fiber receptacle within which is disposed an optical fiber. An optical signal is received from the optical fiber and the optical signal travels through the optical limiting element to the detector element. The optical limiting element optically attenuates the power of the optical signal when the power of the optical signal exceeds a predetermined limit. Thus, the power of the optical signal which reaches the detector element is kept under the predetermined limit and therefore the detector element is not damaged by high-powered optical signals.

BRIEF DESCRIPTION OF THE DRAWINGS

To further clarify the above and other aspects of embodiments of the present invention, a more particular description of the invention will be rendered by reference to specific embodiments thereof which are illustrated in the appended drawings. These drawings depict only typical embodiments of the invention and are therefore not to be considered limiting of its scope. In addition, the drawings are not drawn to scale. The invention will be described and explained with additional specificity and detail through the use of the accompanying drawings in which.

DETAILED DESCRIPTION OF EXEMPLARY EMBODIMENTS OF THE INVENTION

Embodiments of the present invention concern incorporation of certain optical materials, sometimes known as "optical limiting materials," into ROSAs to limit the power of optical signals received by the detector element and to prevent damage to the detector element located within the ROSA. In one embodiment of the invention, an optical fiber is received into one end of the ROSA and an optical detector is located at a second end of the ROSA. An optical limiting element is located between the optical fiber and the optical detector. When an optical signal is received from the optical fiber, the optical signal passes through the optical limiting element before being detected by the optical detector. If the power of the optical signal entering the optical limiting element is above a predetermined level, the optical limiting element attenuates the optical signal so that the power of the optical signal exiting the optical limiting element is at an acceptable level. In this way, the optical limiting element prevents optical signals having unacceptably high power levels from damaging the optical detector.

I. Exemplary Operating Environments

Figure 1:
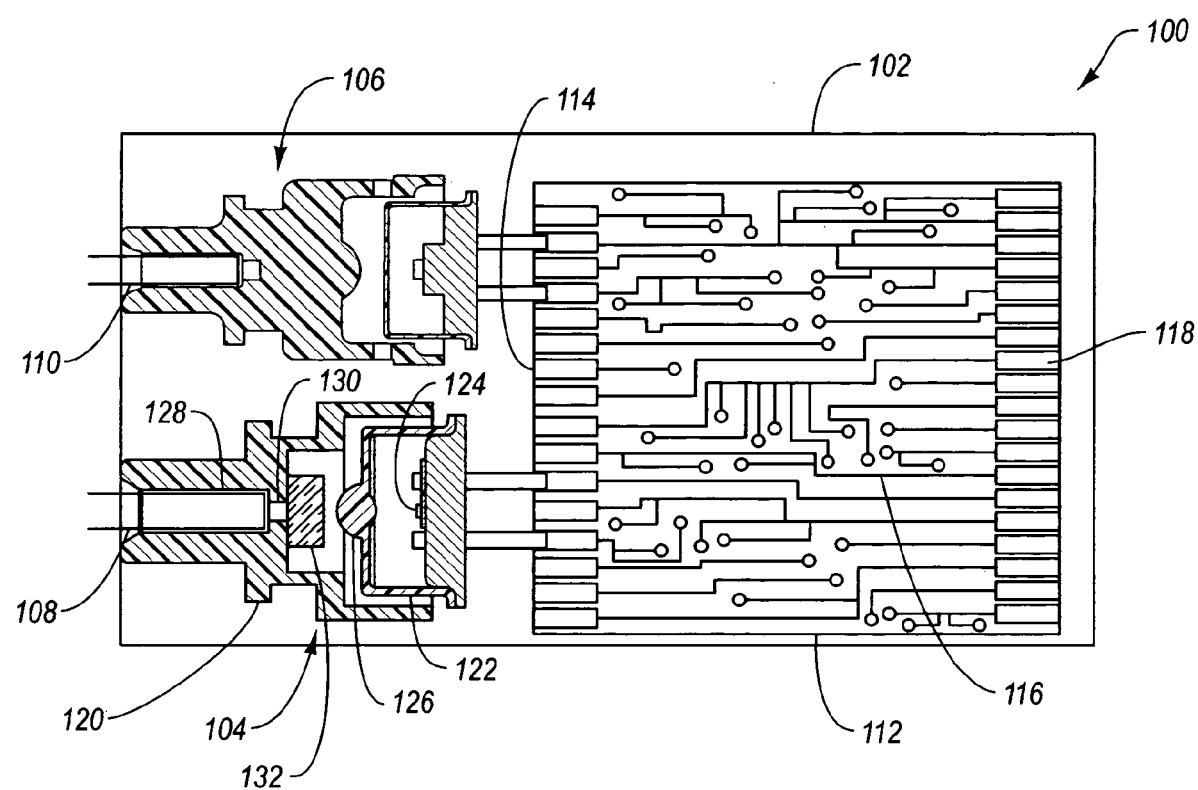
FIG. 1 is a cutaway view of an exemplary optical transceiver module incorporating optical limiting materials.

With attention now to FIG. 1, a cut-away view of an exemplary transceiver 100 is shown. Transceiver 100 includes a housing 102 substantially enclosing ROSA 104 and TOSA 106. ROSA 104 receives optical fiber 108 and TOSA 106 receives optical fiber 110. ROSA 104 and TOSA 106 are connected to printed circuit board ("PCB") 112. PCB 112 includes first electrical contact elements 114 which connect to signal traces 116. Signal traces 116 connect with circuitry of PCB 112 (not shown) as well as second electrical contact elements 118. Such circuitry may include, for example, a post-amplifier, and a laser driver. Finally, second electrical contact elements 118 connect to external components, such as a host device for example (not shown).

In general, when an optical signal is received into transceiver 100 by way of optical fiber 108, the optical signal enters ROSA 104 and is converted from an optical signal to an electrical signal. The electrical signal is then transmitted to PCB 112 where the electrical signal travels from first electrical contact elements 114 along signal traces 116 to second electrical contact elements 118. The electrical signal is then transmitted to electrical components (not shown) located inside and/or outside transceiver 100.

In addition to transmitting electrical signals to external components, the transceiver 100 also receives electrical signals from external components. In particular, when an electrical signal is received by transceiver 100 from an external component, the electrical signal travels from second electrical contact elements 118 through signal traces 116 to first electrical contact elements 114, until the electrical signal is transmitted to TOSA 106. Upon entering TOSA 106, the electrical signal is converted to an optical signal and the optical signal is then transmitted from TOSA 106 through optical fiber 110.

With the foregoing general description in view, further details will now be provided concerning aspects of the structure and operation of an exemplary ROSA 104. In particular, ROSA 104 includes a housing 120 and enclosure 122 that are attached to each other. A detector element is disposed within enclosure 122 and a lens 126 of the enclosure 122 is positioned to focus an optical signal onto the detector element 124. In one embodiment of the invention, enclosure 122 is a TO-can and lens 126 is the window of the TO-can, and the enclosure 122 and lens 126 cooperate to define a hermetic enclosure within which detector element 124 is disposed. Note that in some alternative embodiments, one or more lenses and/or other optical components may likewise be employed in the ROSA, depending upon the particular optical effect(s) desired to be achieved.

With continuing reference to exemplary ROSA 104, a second end of ROSA 104 includes a fiber receptacle 128 that limits the depth to which optical fiber 108 can be inserted into ROSA 104. In general, optical limiting material 132 is positioned in ROSA 104 in one or more locations between optical fiber 108 and detector element 124 so that when an optical signal is received by the ROSA 104, the optical signal travels from optical fiber 108 through optical limiting element 132 and lens 126. The optical signal continues to detector element 124 where the optical signal is converted into an electrical signal. In one exemplary embodiment, the distance between the end of the optical fiber 108, positioned in the fiber receptacle 128, and detector element 124 is about 1 mm or less. Of course, various other arrangements of the components of the ROSA 104 may alternatively be employed.

When the optical limiting element 132 is positioned generally as described above, an optical signal traveling through ROSA 104 will pass through optical limiting element 132 before being detected by detector element 124. In general, it is a characteristic of the optical limiting element 132 that when the power of the optical signal entering the optical limiting element 132 exceeds a predetermined power limit, the optical limiting element 132 attenuates the optical signal to a predetermined extent, thereby protecting detector element 124 from receiving an optical signal having a power level that would damage detector element 124. Exemplary properties of optical limiting material are discussed in further detail with regard to FIG. 7 below. Optical limiting materials may also be incorporated into TOSA 106 located within transceiver 100. Examples of such arrangements are disclosed and claimed in U.S. patent application Ser. No. 11/070,756, entitled "Transmitter Optical Sub-Assembly With Eye Safety" (presently designated as Workman Nydegger), filed on the same day as the present application and incorporated herein in its entirety by this reference.

II. Exemplary ROSAs with Optical Limiting Materials

Figure 2:
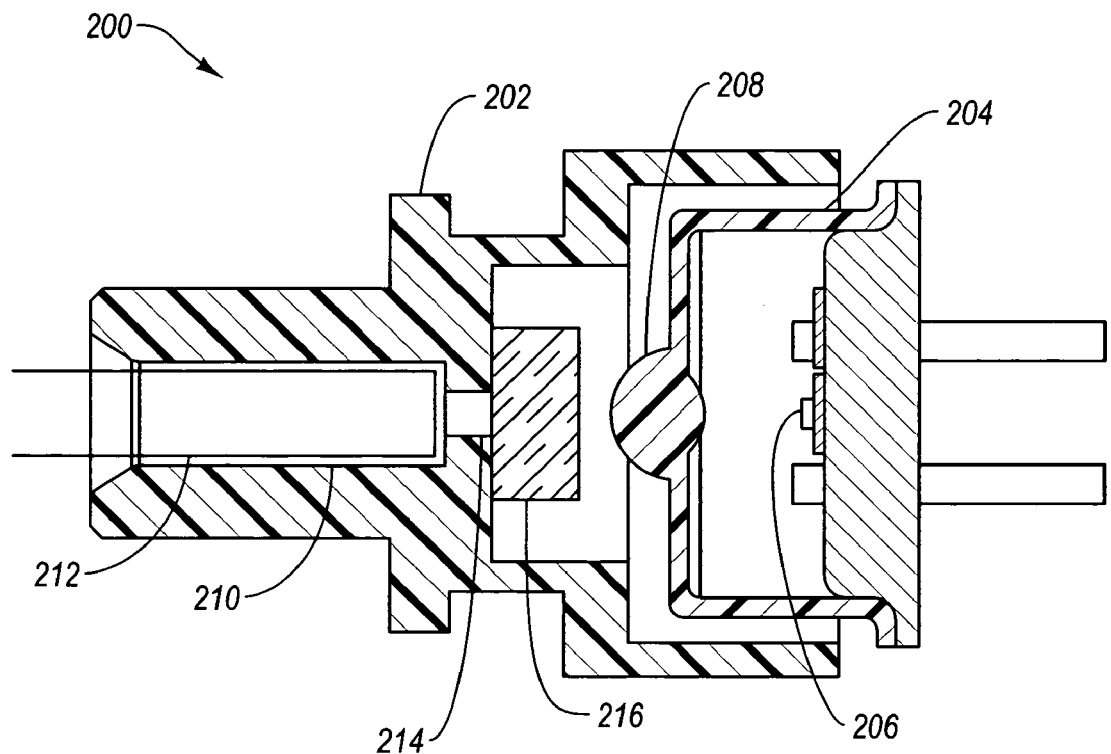
FIG. 2 is a cutaway view of an exemplary ROSA incorporating optical limiting materials.

With attention now to FIG. 2, a cut-away view of ROSA 200 is shown. In this exemplary embodiment, the housing 202 of the ROSA 200 is a single plastic molded element. Housing 202 may be fabricated of any number of different materials including, for example, plastic, glass, or any other optically suitable material. As indicated in FIG. 2, the housing 202 of ROSA 200 engages an enclosure 204, exemplary implemented as a TO-can, within which a detector element 206 is disposed and hermetically sealed. In one embodiment of the invention, detector element 206 is an avalanche photodiode detector (APD). Various other types of detector elements may alternatively be employed however. Examples of such detector elements include, but are not limited to, a PIN photodiode. As well, a lens 208 of the enclosure 204 is configured and positioned to focus an optical signal onto detector element 206. In the illustrated embodiment, the lens 208 is integral with the enclosure 204, but comprises a discrete component in some alternative embodiments.

With continuing attention to the exemplary ROSA 200 of FIG. 2, the housing 202 defines a fiber receptacle 210 within which an optical fiber 212 is received. The fiber receptacle 210 communicates with a fiber stop 214 that serves to limit the extent to which the optical fiber 212 can be inserted into the housing 202 of the ROSA 200. Similar to the exemplary arrangement disclosed in FIG. 1, optical limiting material 216 is positioned in ROSA 200 between optical fiber 212 and detector element 206 to attenuate, if necessary, the power of optical signals received into the ROSA 200 from optical fiber 212, so as to prevent damage to the detector element 206.

In the exemplary embodiment illustrated in FIG. 2, the optical limiting element 216 takes the form of a block of material that is attached to the housing 202 so as to be positioned between the fiber stop 214 and the lens 208. As noted elsewhere herein however, this arrangement is exemplary only, and the configuration and positioning of the optical limiting element 216 may be modified as necessary.

In operation, when an optical signal is received into ROSA 200, the optical signal is transmitted from optical fiber 212 through fiber stop 214 and optical limiting element 216. If the power of the optical signal received at the optical limiting element 216 from the optical fiber 212 is below a predetermined limit, the optical signal passes through optical limiting element 216 without attenuation.

On the other hand, if the power of the optical signal received at the optical limiting element 216 from the optical fiber 212 is above a predetermined limit, optical limiting element 216 optically attenuates the power of the optical signal to the extent necessary to ensure that the optical power of the optical signal at the detector element 206 is within acceptable limits. The detector element 206 then detects the optical signal and converts the received optical signal to an electrical signal. In this way, the optical signal that ultimately reaches optical detector 206 has been optically attenuated, if necessary, to a level which is below an optical overload limit, damage threshold, and/or other predetermined limit(s) associated with optical detector 206.

As noted earlier herein, the position(s) of the optical limiting element(s) within a ROSA can be varied. With attention now to FIG. 3, details are provided concerning a ROSA 300 where the optical limiting element is positioned adjacent to the detector element.

Figure 3:
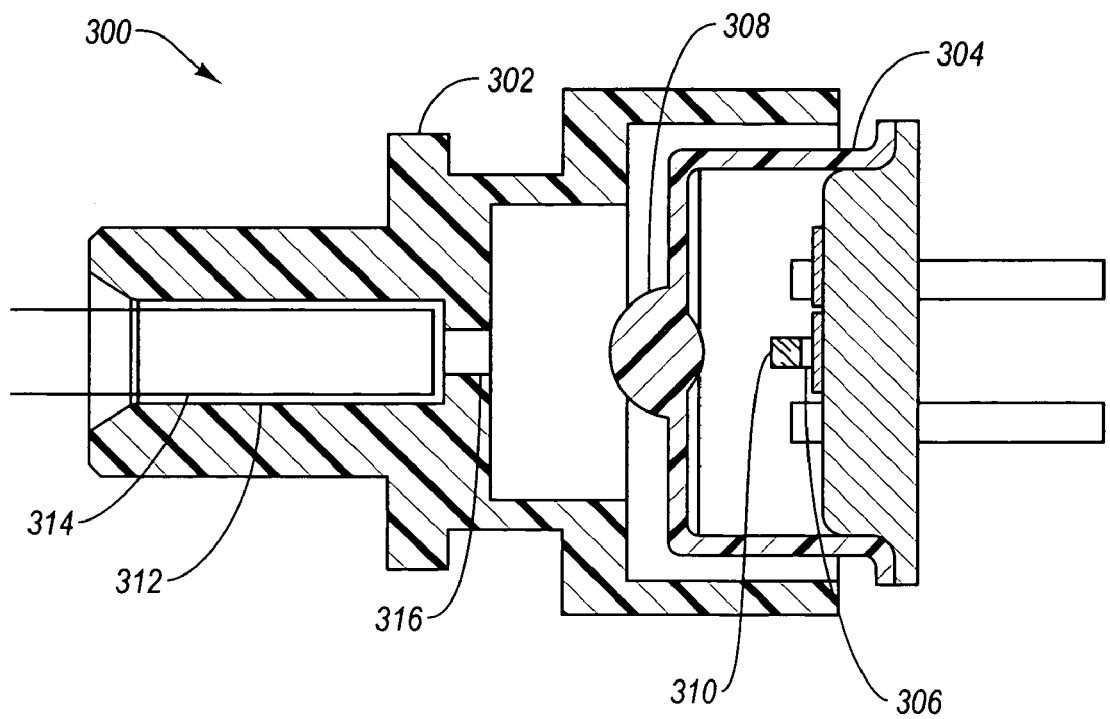
FIG. 3 is a cutaway view of an exemplary ROSA incorporating optical limiting materials on the detecting surface of a detector element.

As indicated in FIG. 3, the exemplary ROSA 300 includes a housing 302 configured to engage an enclosure 304. A detector element 306 is positioned within the enclosure 304 and is arranged to receive optical signals from a lens 308, where the lens 308 is implemented as an integral portion of the enclosure 304. In this exemplary embodiment, optical limiting element 310 is provided that is positioned directly on the detecting surface of optical detector 306.

With continuing reference to FIG. 3, the housing 302 of the ROSA 300 defines a fiber receptacle 312 within which is received an optical fiber 314. A fiber stop 316 is defined by the housing 302 at one end of the fiber receptacle 312 so as to limit the depth to which optical fiber 314 can be inserted into the housing 302 of the ROSA 300.

When optical fiber 314 receives an optical signal, the optical signal travels from optical fiber 314 through fiber stop 316 to lens 308. The lens 308 then focuses the optical signal and passes the optical signal to the optical limiting element 310, located on the detecting surface of detector element 306. In general, and as described above in connection with the discussion of FIG. 1 for example, the optical limiting element 310 attenuates, to the extent necessary, the power of the optical signal transmitted to the detector element 306, so as to prevent damage to, or other problems with, the detector element 306. The extent to which such attenuation is implemented, if at all, may be defined, for example, by an optical overload limit, or a damage threshold of the detector element 306. More generally, the extent to which optical attenuation is implemented by the optical limiting element 310 can be determined with reference to any of a variety of thresholds and limits.

Figure 4:
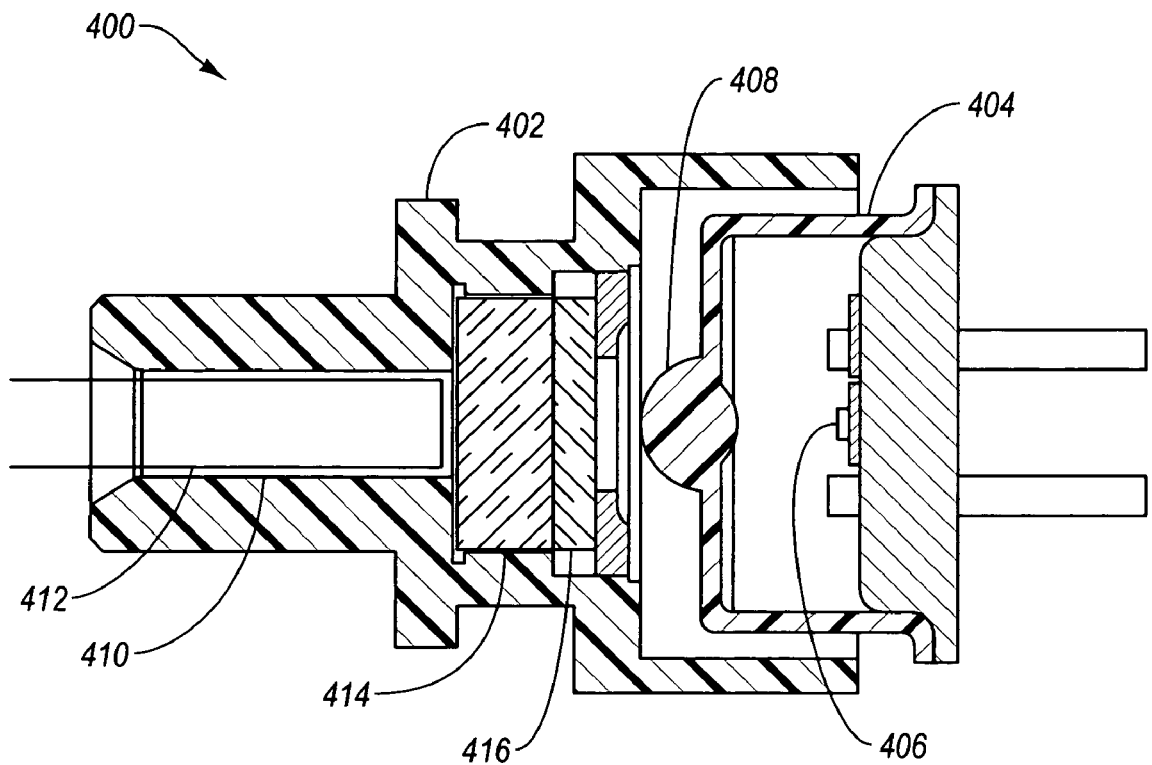
FIG. 4 is a cutaway view of an exemplary ROSA incorporating optical limiting materials in conjunction with a physical contact element.

Directing attention now to FIG. 4, details are provided concerning yet another alternative embodiment of the invention. In this instance, a ROSA 400 is disclosed that includes a housing 402 attached to an enclosure 404. Similar to other exemplary embodiments disclosure herein, a detector element 406 is disposed within the enclosure 404 and hermetically sealed therein by the cooperation of the enclosure 404, and a lens 408. In this embodiment, the lens 408 serves to focus an incoming optical signal onto the detector element 406. As well, the housing 402 of ROSA 400 defines a fiber receptacle 410 which receives an optical fiber 412.

In contrast with other exemplary embodiments disclosed herein, the exemplary embodiment disclosed in FIG. 4 further includes a physical contact element 414 positioned to contact the fiber receptacle 410 in order to limit reflection within ROSA 400. In addition, physical contact element 414 ensures that optical fiber 412 does not extend beyond the end of fiber receptacle 410. In one embodiment of the invention, physical contact element 414 is glass, but embodiments of the invention are not limited to glass and may include plastic or other suitable materials. In this embodiment then, optical limiting element 416 is positioned in ROSA 400 between the physical contact element 414 and the detector element 406, and the optical limiting element is in contact with the physical contact element 414.

In operation, an optical signal is received into ROSA 400 through optical fiber 412. The optical signal travels through physical contact element 414 and into the optical limiting element 416. If the power of the optical signal transmitted into the optical limiting element 416 is below a predetermined limit, the optical signal remains substantially unchanged as the optical signal passes through the optical limiting element 416. However, if the power of the optical signal entering the optical limiting element 416 exceeds a predetermined limit, the optical limiting element 416 optically attenuates the power of the incoming optical signal so that the power of the optical signal exiting the optical limiting element 416 is below the predetermined limit. Thus, optical limiting element 416 ensures that the power of the optical signal ultimately received by detector element 406 is below the predetermined limit.

Figure 5:
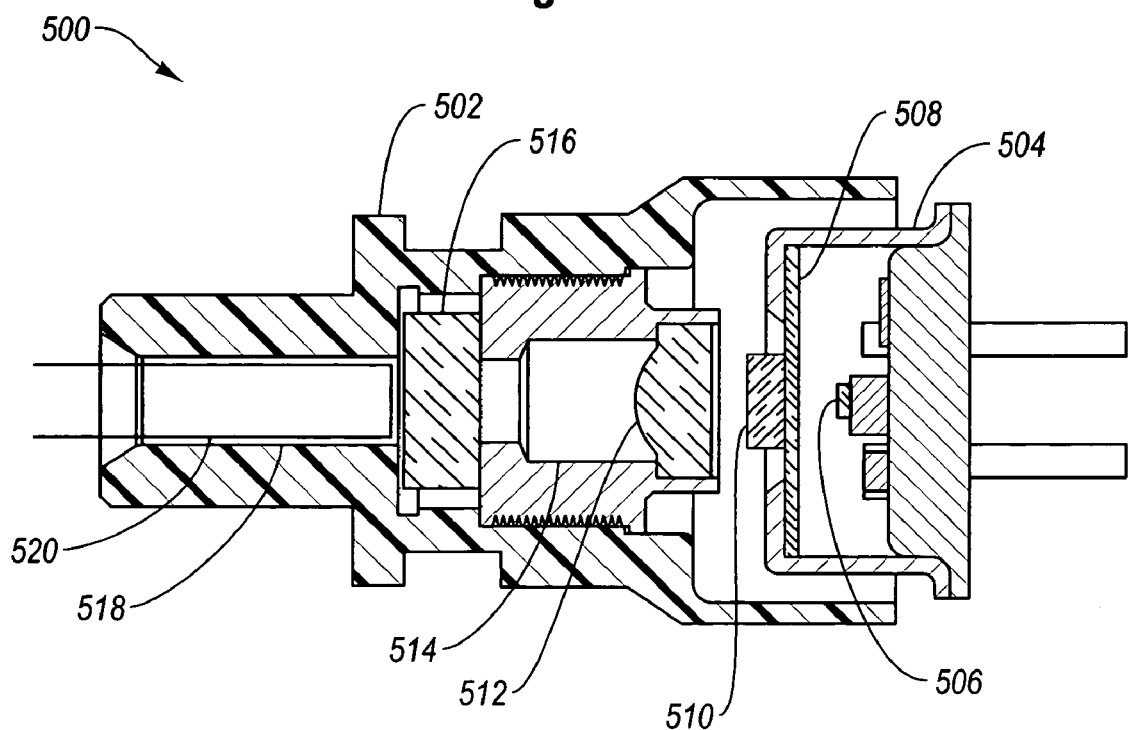
FIG. 5 is a cutaway view of an exemplary ROSA incorporating optical limiting materials and a discrete lens.

Directing attention now to FIG. 5, a cut-away view of an alternative ROSA, denoted generally at 500 and incorporating optical limiting elements and a discrete lens, is shown. As shown in the Figure, a housing 502 of ROSA 500 engages enclosure 504, and a detector element 506 is disposed within the enclosure 504. The enclosure 504 includes a window 508 positioned proximate the detector element 506 to allow an optical signal to pass through enclosure 504 to the detector element 506. This alternative embodiment differs from other exemplary embodiments in that the optical limiting material 510 is located on the window 508 of enclosure 504, in order to limit the power of optical signals transmitted to the detector element 506.

In addition, the lens arrangement employed in ROSA 500 likewise differs from that of some other embodiments. In particular, a discrete lens 512 is provided that is held in place by lens holder 514, and positioned within ROSA 500 to focus an optical signal onto detector element 506. A physical contact element 516 is interposed between the lens holder 514 and fiber receptacle 518 and, in at least some embodiments, the physical contact element contacts one or both of the lens holder 514 and fiber receptacle 518.

In operation, an optical signal received into ROSA 500 is initially transmitted from optical fiber 520 through physical contact element 516 to lens 512. Lens 512 focuses the optical signal, which is then transmitted through optical limiting element 510 located on the window 508 of enclosure 504. If the power of the optical signal transmitted to optical limiting element 510 is below a predetermined limit, the optical signal remains substantially unchanged as the optical signal passes through optical limiting element 510. However, if the power of the optical signal transmitted to optical limiting element 510 is above a predetermined limit, the optical limiting element 510 optically attenuates the optical signal, thus ensuring that the optical signal detected by detector element 506 does not exceed the predetermined limit.

Figure 6:
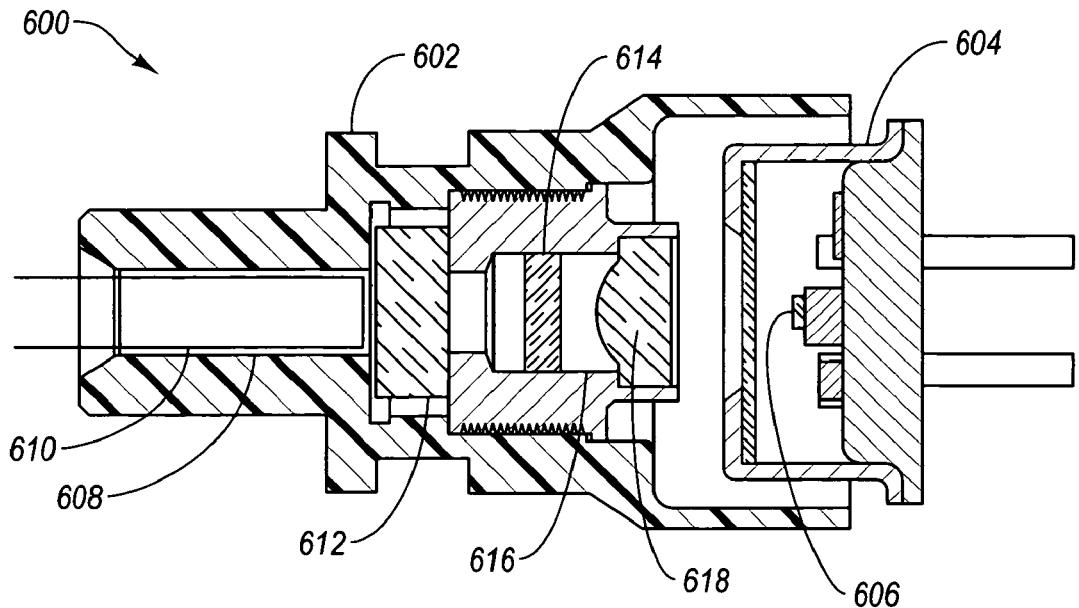
FIG. 6 is a cutaway view of an exemplary ROSA incorporating optical limiting materials positioned within a lens holder.

Directing attention now to FIG. 6, a further exemplary embodiment of the invention is disclosed. Similar to other exemplary embodiments disclosed herein, FIG. 6 shows a cut-away view of a ROSA 600 that includes a housing 602 and enclosure 604 engaged with each other. A detector element 606 is provided that is disposed within the enclosure 604. In addition to engaging enclosure 604, the housing 602 defines fiber receptacle 608 within which is disposed an optical fiber. 610.

The ROSA 600 further includes a physical contact element 612 and lens holder 614. Optical limiting element 614 is positioned in the lens holder 616 between optical fiber 610 and detector element 606, and the lens holder additionally retains one or more lenses 618, and/or other optical components.

When an optical signal is received into ROSA 600, the optical signal enters ROSA 600 through optical fiber 610. The optical signal then travels through physical contact element 612 and optical limiting element 614. If the power of the optical signal transmitted to optical limiting element 614 is below a predetermined limit, the optical signal will remain substantially unchanged as the optical signal travels through optical limiting element 614. However, if the power of the optical signal exceeds the predetermined limit, the optical limiting element 614 optically attenuates the power of the optical signal to ensure that the power of the optical signal detected by detector element 614 is below the predetermined limit. After passing through optical limiting element 614, the optical signal continues through lens 618, where the optical signal is focused onto detector element 606. The optical signal is then received and converted to an electrical signal by detector element 606.

III. Exemplary Optical Limiting Materials

As is evident from this disclosure, the disclosed optical limiting materials are exemplary structural embodiments of a means for optically attenuating the power of an optical signal. However, the scope of the invention is not limited to the exemplary types and arrangements of the exemplary optical limiting materials disclosed herein. Rather, any other structure(s) of comparable functionality may likewise be employed.

As suggested earlier herein, optical limiting materials are materials having non-linear optical properties, for at least some optical power ranges, whereby transmissivity through the optical limiting material is very high for low powered optical signals and transmissivity decreases to a low level if the power of the optical signal exceeds a predetermined upper limit. Further, optical limiting materials have characteristic response times for attenuating optical signals that exceed a given power threshold. The particular desired response time may vary from one application and/or device to another.

The optical limiting material can be effectively employed with a variety of optical signals generated by devices such as, but not limited to, FP lasers, DFB lasers, and VCSELs. As well, optical limiting materials are suited for use with various types of detectors, examples of which include avalanche photodiodes ("APD"), and P-I-N photodiodes. Similarly, the particular optical limiting material to be employed in a given situation is typically selected with respect to the particular wavelength, or range of wavelengths, that the optical limiting material is expected to encounter. Examples of such wavelengths include, but are not limited to, 1310 nm and 1550 nm. The foregoing are examples only however and the scope of the invention should not be construed to be limited to any particular device, configuration or operating wavelength(s).

It was noted earlier herein that one damage mechanism for detector elements is thermal in nature. Therefore, in order to protect a detector element from damage due to receipt of excess optical power which could raise the temperature of the detector element or other optical transceiver components to unacceptable levels, exemplary optical limiting materials limit the time the detector is exposed to the high powered optical signal to a period significantly shorter than the time period necessary to raise the temperature beyond a critical point.

For optical power levels of about 6-20 dBm or 4-100 mW for example, the time scale is in the range of microseconds, or about $10^{-6}$-$10^{-3}$ seconds. Therefore, optical limiting materials incorporated into some embodiments of the invention are characterized by response times of about $10^{-6}$ to about $10^{-3}$ seconds. However, the response times of optical limiting materials used in the present invention will vary and are not limited to any particular times.

Another parameter of optical limiting materials relates to the effect, on the optical limiting materials, of optical signals whose power is above a predetermined limit. In particular, the response of optical limiting materials to optical power signals received into the ROSA may be reversible or irreversible. Although high powered optical signals are attenuated by both reversible and irreversible optical limiting materials, the transmissivity of the reversible optical limiting materials returns to relatively high levels when the power of the optical signal decreases below the predetermined power limit. In contrast, irreversible optical limiting materials are unable to return to high levels of optical signal transmissivity once an optical signal exceeds the power threshold.

Reversible optical materials can further be divided into at least two categories. Materials in the first category are largely absorptive, and may also be known as two-photon absorption materials. Materials in the second category are largely refractive. Although refractive optical limiting materials are suitable for use in optical systems having a strongly converging or diverging optical beam, refractive and/or absorptive optical limiting materials are useful in exemplary embodiments of the present invention.

As noted above, embodiments of the present invention incorporate optical limiting materials, examples of which include absorptive or refractive materials, into ROSAs to improve the optical overload limit, and to increase the damage threshold for detector elements. The use of optical limiting materials with suitable response times and energy absorption helps ensure that the optical power reaching detector element is maintained below the optical overload limit, or other predetermined limit, of the detector element for a large range of optical input powers. Further, incorporation of optical limiting materials into a ROSA can be performed without adverse impact to the overall structure and design of the associated transceiver.

Various aspects of embodiments of the invention can be modified as necessary to allow the use of particular arrangements and materials and/or to achieve desired effects. For example, the optical limiting function can be implemented in a ROSA where the distance between the detector element and the optical fiber is about 1 mm or less. In particular, more options are possible if the optical limiting material has the mechanical characteristics of glass, which is likely for limiters based on glass doped with appropriate absorbers. For softer materials, a substrate made of glass can be used to support the material.

Furthermore, as another example of such an aspect, some embodiments of the present invention use optical limiting materials that provide little or no optical attenuation effect until the power of the optical signals input to the optical limiting material reaches a level within the range of +3 to +10 dBm, and most typically +6 dBm, as determined by the damage threshold of the detector element. If the optical limiting material is designed to extend the normal operating range of the receiver, then the threshold at which optical attenuation begins falls within the range of −6 to +3 dBm, where this threshold is chosen based on the saturation level of the detector. Since the nature of the response of the optical limiting material is based on optical intensity, measured in terms of power per unit area, the properties of the optical limiting material may make it desirable to place the optical limiting material in a portion of the optical path with a suitable optical signal cross section. Conversely, the location in the optical path may be chosen to tune the effective power limit of the ROSA or transceiver. The optical limiting material is also chosen to have a response time which is shorter than the time at which the optical detector may become damaged by the power of the optical signal.

In general then, various parameters concerning the optical limiting materials may be adjusted as necessary to suit a particular application. Examples of such parameters include, but are not limited to, transmissivity, reversibility, response time, range of limiting power, positioning of the optical limiting materials, and energy absorption.

IV. Performance of Optical Limiting Materials

Figure 7:
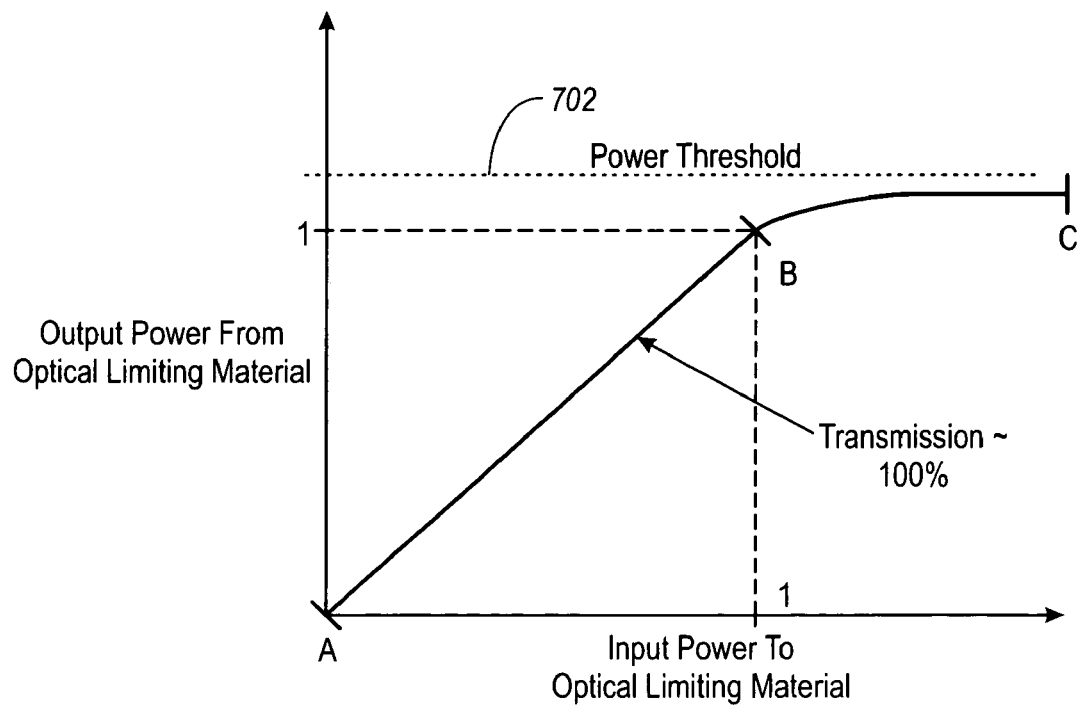
FIG. 7 is a graphical representation of output power of an optical signal exiting an optical limiting material as a function of input power of an optical signal entering an optical limiting material.

With attention now to FIG. 7, a graphical representation of output power from the optical limiting material as a function of the input power to the optical limiting material shows the optical limiting properties of optical limiting materials. Optical limiting materials used in exemplary embodiments of the present invention are selected so that the transmissivity of the optical limiting material corresponds with a specified power threshold, as shown in FIG. 7 by line 702. In one embodiment of the invention, the power threshold is the damage threshold of the detector element.

In another embodiment of the invention, the power threshold is the optical overload limit of the detector element. When the input power of the optical signal received into the optical limiting material is below the power threshold, as shown by line AB, the output power is substantially equal to the input power. Thus, the transmissivity through the optical limiting material is approximately 100%. That is, there is a 1:1 ratio, or unity, between output optical power and input optical power. As the input power reaches an input power threshold, indicated at point "B," that corresponds with an output power that is a predetermined level below the power threshold, the optical limiting material attenuates the power of the optical signal, thereby preventing the power of the output optical signal from exceeding the power threshold, notwithstanding any further increase in the input power beyond the input power threshold "B."

That is, for at least a predetermined range of input powers, increases in the input power to the optical limiting material beyond point "B" do not result in significant changes in the output power from the optical limiting material, due to the attenuation properties of the optical limiting material. Correspondingly, the transmissivity response of the optical limiting material flattens and may approach zero for increases in input optical power beyond the input power threshold.

V. Method for Optical Attenuation

Figure 8:
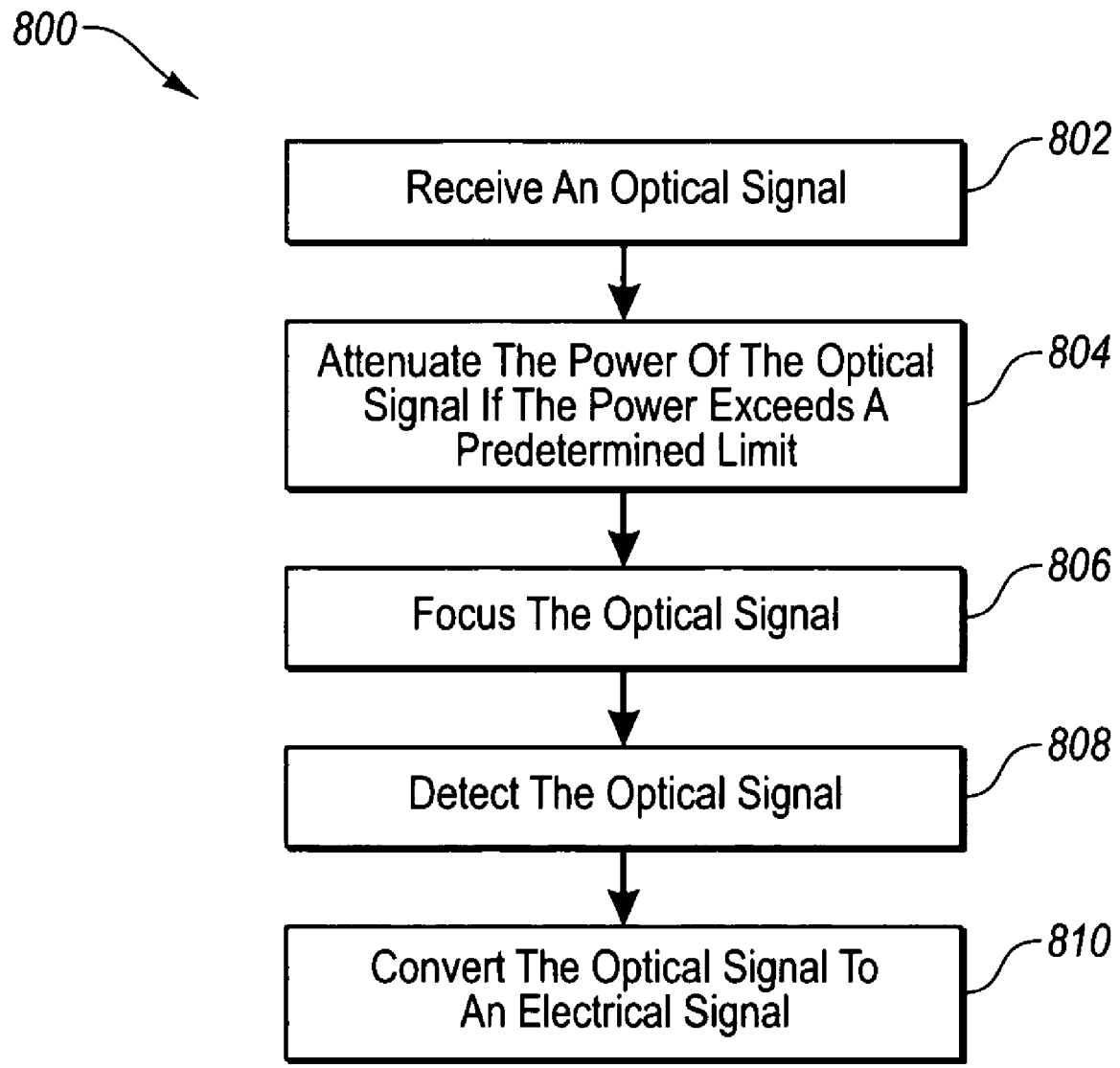
FIG. 8 is a flow diagram showing a method for optically attenuating optical signals.

With attention now to FIG. 8, a method 800 for attenuating the power of an optical signal exceeding a predetermined limit is shown. At stage 802, an optical signal is received. If the power of the received optical signal exceeds a predetermined limit, the power is optically attenuated as shown at stage 804. In this way, no input optical signal having a power over a predetermined limit is received at the detector element.

At stage 806 of the method 800, the attenuated optical signal is focused. The attenuated optical signal is then detected, as shown at stage 808. Finally, at stage 810, the attenuated optical signal is converted to an electrical signal.

The present invention may be embodied in other specific forms without departing from its spirit or essential characteristics. The described embodiments are to be considered in all respects only as illustrative and not restrictive.

What is claimed is:

1. A receiver optical subassembly comprising:
an enclosure within which a detector element is disposed;
a housing attached to the enclosure and defining a fiber receptacle configured so that when an optical fiber is received in the fiber receptacle, signals from the optical fiber are directed into the detector element; and
an optical limiting element permanently positioned between the detector element and the fiber receptacle, wherein the optical limiting element has a non-uniform optical attenuation property.

2. The receiver optical subassembly as recited in claim 1, wherein the optical limiting element is one of: absorptive; or, refractive.

3. The receiver optical subassembly as recited in claim 1, wherein the detector element comprises one of: an APD; or, a P-I-N photodiode.

4. The receiver optical subassembly as recited in claim 1, wherein the optical limiting element has a property such that when power of the optical signal entering the optical limiting element falls within a predetermined range, power of the optical signal leaving the optical limiting element remains at or below a predetermined limit, wherein the predetermined limit is one of an optical overload limit; or, a damage threshold.

5. The receiver optical subassembly as recited in claim 1, wherein the enclosure comprises a TO-can.

6. The receiver optical subassembly as recited in claim 5, wherein the TO-can includes a window to which the optical limiting element is attached.

7. The receiver optical subassembly as recited in claim 1, wherein the optical limiting element is incorporated into a physical contact element positioned adjacent to the fiber receptacle.

8. The receiver optical subassembly as recited in claim 1, further comprising a physical contact element to which the optical limiting element is bonded, the physical contact element being interposed between the fiber receptacle and the detector element.

9. The receiver optical subassembly as recited in claim 1, wherein the optical limiting element is positioned on the detector element.

10. The receiver optical subassembly as recited in claim 1, wherein a transmissivity of the optical limiting element is substantially linear in a first range of input optical powers, and substantially non-linear in a second range of input optical powers.

11. The receiver optical subassembly as recited in claim 1, further comprising a lens interposed between the fiber receptacle and the detector element.

12. The receive optical subassembly as recited in claim 1, wherein the property of the optical limiting element is such that the optical limiting element has a transmissivity that is substantially unity until the power of the optical signal entering the optical limiting element falls within one of the following ranges: about −6 dBm to about +3 dBm; or, about +3 dBm to about +10 dBm.

13. An optical transceiver module comprising:
a printed circuit board;
a transmitter optical subassembly connected to the printed circuit board;
a receiver optical subassembly connected to the printed circuit board, and comprising:
  a detector element;
  a fiber receptacle configured so that when an optical fiber is received therein signals from the optical fiber pass into the detector element; and
  means for optically attenuating an optical signal;
  a fiber contacting element positioned between the means for optically attenuating an optical signal and the fiber receptacle, the fiber contacting element configured to prevent an optical fiber received by the fiber receptacle from contacting the means for optically attenuating an optical signal, and
a housing that substantially encloses the printed circuit board, the transmitter optical subassembly, and the receiver optical subassembly.

14. The optical transceiver module as recited in claim 13, wherein the means for optically attenuating an optical signal only attenuates received optical signals when a power of a received optical signal falls within a predetermined range.

15. The optical transceiver module as recited in claim 13, wherein the means for optically attenuating an optical signal absorbs optical power from a received signal only if the optical power of the received signal exceeds a predetermined limit.

16. The optical transceiver module as recited in claim 13, wherein the means for optically attenuating an optical signal begins limiting optical power of an optical signal exiting the fiber when the optical power of the optical signal falls within one of the following ranges: about −6 dBm to about +3 dBm; or, about +3 dBm to about +10 dBm.

17. The optical transceiver module as recited in claim 13, wherein the means for optically attenuating an optical signal operates by one of the following mechanisms: absorption; or, refraction.

18. The optical transceiver module as recited in claim 15, wherein the predetermined limit is one of: an optical overload limit; or, an optical damage threshold.

19. The optical transceiver module as recited in claim 13, wherein the detector element comprises one of: an APD; or, a P-I-N photodiode.

20. The receive optical subassembly as recited in claim 1, wherein the property of the optical limiting element is such that the optical limiting element has a transmissivity that is substantially unity until the power of the optical signal entering the optical limiting element reaches an input power threshold at which point the transmissivity of the optical limiting element is no longer substantially unity.

21. The optical transceiver module as recited in claim 13, wherein the means for attenuating the optical signal provides at least two different levels of attenuation.

22. The optical transceiver module as recited in claim 21, wherein the at least two different levels of attenuation are produced based on an optical power of the optical signal.

23. An optical subassembly comprising:
an enclosure within which a detector element is disposed;
a housing receiving the enclosure at a first end and defining a fiber receptacle at a second end; and
an optical limiting element permanently positioned between the detector element and the fiber receptacle, wherein the optical limiting element is configured to have at least two different optical attenuation levels.

24. An optical subassembly according to claim 23, wherein the at least two different optical attenuation levels are defined by an input power threshold.

25. An optical subassembly according to claim 24, wherein transmissivity through the optical limiting material is approximately 100% when the input power of the input optical signal is at a power level below the input power threshold.

26. An optical subassembly according to claim 25, wherein the transmissivity through the optical limiting material is less than approximately 100% when the input power of the input optical signal is at a level above the input power threshold.

27. An optical subassembly according to claim 23, wherein the optical limiting element has non-uniform optical attenuation properties.

28. A transceiver comprising an optical assembly according to claim 23, the transceiver further comprising:
a transmitter optical subassembly configured to transmit optical signals.

29. The receiver optical subassembly as recited in claim 1, further comprising a lens interposed between the fiber receptacle and the optical limiting element.

30. The optical subassembly as recited in claim 23, wherein the optical limiting element includes glass doped with an absorber.

31. The optical subassembly as recited in claim 23, wherein the optical limiting element is affixed to a window of the enclosure.

32. The optical subassembly as recited in claim 23, wherein the optical limiting element is positioned within the enclosure.

33. The optical subassembly as recited in claim 32, wherein the optical limiting element is affixed to a top surface of the detector element.

* * * * *

UNITED STATES PATENT AND TRADEMARK OFFICE
CERTIFICATE OF CORRECTION

PATENT NO. : 7,325,982 B2  Page 1 of 1
APPLICATION NO. : 11/070872
DATED : February 5, 2008
INVENTOR(S) : Aronson It is certified that error appears in the above-identified patent and that said Letters Patent is hereby corrected as shown below:

Column 4
Line 2, after "detector element", add [124]
Line 15, after "fiber receptacle", add [and a fiber stop 130]

Column 6
Line 35, after "optical limiting element", add [416]

Column 7
Line 33, change "lens holder 614" to --lens holder 616--
Line 49, change "detector element 614" to --detector element 606--

Column 10
Line 61, change "limit is one of an optical" to --limit is one of: an optical--

Signed and Sealed this

Twenty-first Day of December, 2010

David J. Kappos
*Director of the United States Patent and Trademark Office*